United States Patent
Baniak et al.

(10) Patent No.: US 7,103,165 B2
(45) Date of Patent: Sep. 5, 2006

(54) PROFILE MANAGEMENT SYSTEM INCLUDING USER INTERFACE FOR ACCESSING AND MAINTAINING PROFILE DATA OF USER SUBSCRIBED TELEPHONY SERVICES

(75) Inventors: Paul G. Baniak, St. Louis, MO (US); Kristin Chambers, Austin, TX (US); Katherine L. Krein, St. Louis, MO (US); Christopher H. Rolwes, St. Louis, MO (US); Terry L. Vieth, St. Louis, MO (US); Tracy L. Brokaw, St. Louis, MO (US); Mary B. Clark, St. Louis, MO (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

(21) Appl. No.: 10/761,382

(22) Filed: Jan. 22, 2004

(65) Prior Publication Data

US 2004/0151294 A1   Aug. 5, 2004

Related U.S. Application Data

(63) Continuation of application No. 09/050,986, filed on Mar. 31, 1998, now abandoned.

(60) Provisional application No. 60/042,680, filed on Apr. 3, 1997.

(51) Int. Cl.
*H04M 3/42* (2006.01)

(52) U.S. Cl. .............................. 379/201.02; 379/207.13

(58) Field of Classification Search ........... 379/201.01, 379/201.02, 201.12, 207.13
See application file for complete search history.

(56) References Cited

U.S. PATENT DOCUMENTS 4,232,199 A    11/1980    Boatwright et al.

(Continued)

FOREIGN PATENT DOCUMENTS

EP    0611083    8/1994

(Continued)

OTHER PUBLICATIONS

"MegaHub PACE SMS—Service Management System—Advanced Intelligent Network Systems," Communications Corporation, Issue 0.4, Jul. 17, 1994.

(Continued)

*Primary Examiner*—William J. Deane, Jr.
(74) *Attorney, Agent, or Firm*—Greenblum & Bernstein, P.L.C.

(57) ABSTRACT

A profile management system is provided for accessing and maintaining profile data associated with a telecommunications service subscribed to by a user. The profile data is stored on a telecommunications network which executes the telecommunications service subscribed to by the user in accordance with the profile data. The profile management system includes a client and a server. The client hosts a user interface allowing the user to view and update the profile data. The server processes user requests from the client to view and update the profile data by obtaining the profile data from the telecommunications network and forwarding the profile data to the client. The server also processes user requests from the client to update the profile data by forwarding user updates of the profile data from the client to the telecommunications network. As a result of the profile management system, the user can access and maintain the profile data associated with the telecommunications service subscribed to by the user without involving service personnel.

16 Claims, 8 Drawing Sheets

U.S. PATENT DOCUMENTS

| | | | |
|---|---|---|---|
| 4,296,463 A | 10/1981 | Dalboussiere et al. | |
| 4,429,188 A | 1/1984 | Allen | |
| 4,611,094 A | 9/1986 | Asmuth et al. | |
| 4,611,096 A | 9/1986 | Asmuth et al. | |
| 4,788,718 A | 11/1988 | McNabb | |
| 4,860,347 A | 8/1989 | Costello | |
| 4,878,240 A * | 10/1989 | Lin et al. | 379/88.22 |
| 4,897,866 A * | 1/1990 | Majmudar et al. | 379/201.05 |
| 4,899,373 A | 2/1990 | Lee et al. | |
| 5,054,055 A | 10/1991 | Hanle et al. | |
| 5,109,408 A | 4/1992 | Greenspan et al. | |
| 5,200,995 A | 4/1993 | Gaukel et al. | |
| 5,222,125 A * | 6/1993 | Creswell et al. | 379/114.05 |
| 5,241,588 A | 8/1993 | Babson, III et al. | |
| 5,247,571 A | 9/1993 | Kay et al. | |
| 5,294,229 A | 3/1994 | Harzell et al. | |
| 5,333,185 A | 7/1994 | Burke et al. | |
| 5,337,351 A | 8/1994 | Manabe et al. | |
| 5,345,380 A | 9/1994 | Babson, III et al. | |
| 5,353,331 A | 10/1994 | Emery et al. | |
| 5,396,546 A * | 3/1995 | Remillard | 379/93.24 |
| 5,398,220 A | 3/1995 | Barker | |
| 5,404,396 A | 4/1995 | Brennan | |
| 5,436,957 A | 7/1995 | McConnell | |
| 5,438,568 A | 8/1995 | Weisser, Jr. | |
| 5,444,768 A | 8/1995 | Lemaire et al. | |
| 5,448,631 A | 9/1995 | Cain | |
| 5,463,682 A * | 10/1995 | Fisher et al. | 379/201.04 |
| 5,467,388 A * | 11/1995 | Redd et al. | 379/210.02 |
| 5,469,500 A * | 11/1995 | Satter et al. | 379/201.05 |
| 5,479,487 A | 12/1995 | Hammond | |
| 5,533,102 A | 7/1996 | Robinson et al. | |
| 5,544,320 A * | 8/1996 | Konrad | 709/203 |
| 5,548,566 A | 8/1996 | Barker | |
| 5,550,909 A | 8/1996 | Chanda et al. | |
| 5,572,583 A | 11/1996 | Wheeler, Jr. et al. | |
| 5,579,384 A | 11/1996 | Seymor | |
| 5,583,564 A | 12/1996 | Rao et al. | |
| 5,592,541 A | 1/1997 | Fleischer, III et al. | |
| 5,615,252 A | 3/1997 | Sizer, II et al. | |
| 5,625,676 A | 4/1997 | Greco et al. | |
| 5,629,978 A | 5/1997 | Blumhardt et al. | |
| 5,642,410 A | 6/1997 | Walsh et al. | |
| 5,655,013 A | 8/1997 | Gainsboro | |
| 5,657,451 A | 8/1997 | Khello | |
| 5,680,446 A | 10/1997 | Fleischer, III et al. | |
| 5,687,212 A | 11/1997 | Kenser, Jr. et al. | |
| 5,696,815 A | 12/1997 | Smyk | |
| 5,740,438 A | 4/1998 | Ratcliff et al. | |
| 5,742,668 A | 4/1998 | Pepe et al. | |
| 5,751,707 A | 5/1998 | Voit et al. | |
| 5,754,636 A | 5/1998 | Bayless et al. | |
| 5,758,351 A | 5/1998 | Gibson et al. | |
| 5,764,748 A | 6/1998 | Rosenthal et al. | |
| 5,787,237 A | 7/1998 | Reilly | |
| 5,790,173 A | 8/1998 | Strauss et al. | |
| 5,796,806 A | 8/1998 | Birckbichler | |
| 5,796,950 A | 8/1998 | Sips et al. | |
| 5,799,073 A | 8/1998 | Fleischer, III et al. | |
| 5,802,157 A | 9/1998 | Clarke et al. | |
| 5,802,159 A | 9/1998 | Smolentzov et al. | |
| 5,805,587 A | 9/1998 | Norris et al. | |
| 5,822,419 A | 10/1998 | Enstone et al. | |
| 5,864,613 A | 1/1999 | Flood | |
| 5,867,562 A | 2/1999 | Scherer | |
| 5,870,549 A | 2/1999 | Bobo, II | |
| 5,881,144 A | 3/1999 | Havens | |
| 5,892,822 A | 4/1999 | Gottlieb et al. | |
| 5,915,008 A * | 6/1999 | Dulman | 379/221.08 |
| 5,917,817 A | 6/1999 | Dunn et al. | |
| 5,920,618 A | 7/1999 | Fleischer, III et al. | |
| 5,933,490 A | 8/1999 | White et al. | |
| 5,933,778 A | 8/1999 | Buhrmann et al. | |
| 5,937,050 A | 8/1999 | Yue et al. | |
| 5,940,488 A | 8/1999 | DeGrazia et al. | |
| 5,946,381 A | 8/1999 | Danne et al. | |
| 5,958,016 A | 9/1999 | Chang et al. | |
| 5,982,774 A | 11/1999 | Foladare et al. | |
| 5,982,870 A | 11/1999 | Pershan et al. | |
| 5,999,611 A | 12/1999 | Tatchell et al. | |
| 6,028,917 A | 2/2000 | Creamer et al. | |
| 6,032,184 A | 2/2000 | Cogger et al. | |
| 6,038,296 A | 3/2000 | Brunson et al. | |
| 6,058,175 A | 5/2000 | Schultz | |
| 6,058,178 A | 5/2000 | McKendry et al. | |
| 6,097,802 A | 8/2000 | Fleischer, III et al. | |
| 6,104,799 A | 8/2000 | Jain et al. | |
| 6,115,040 A | 9/2000 | Bladow et al. | |
| 6,118,780 A | 9/2000 | Dunn et al. | |
| 6,125,126 A | 9/2000 | Hallenst.ang.l | |
| 6,134,310 A | 10/2000 | Swan et al. | |
| 6,160,877 A | 12/2000 | Tatchell et al. | |
| 6,161,128 A | 12/2000 | Smyk | |
| 6,167,122 A | 12/2000 | Titmuss et al. | |
| 6,173,437 B1 | 1/2001 | Polcyn | |
| 6,192,118 B1 | 2/2001 | Bayless et al. | |
| 6,195,678 B1 | 2/2001 | Komuro | |
| 6,195,697 B1 | 2/2001 | Bowman-Amuah | |
| 6,212,561 B1 | 4/2001 | Sitaraman et al. | |
| 6,233,330 B1 | 5/2001 | McClure et al. | |
| 6,240,441 B1 | 5/2001 | Beckett et al. | |
| 6,246,751 B1 | 6/2001 | Bergl et al. | |
| 6,246,756 B1 | 6/2001 | Borland et al. | |
| 6,259,449 B1 | 7/2001 | Saxena et al. | |
| 6,263,064 B1 | 7/2001 | O'Neal | |
| 6,317,484 B1 | 11/2001 | McAllister | |
| 6,320,948 B1 | 11/2001 | Heilmann et al. | |
| 6,330,598 B1 | 12/2001 | Beckwith et al. | |
| 6,337,899 B1 | 1/2002 | Alcendor et al. | |
| 6,445,694 B1 | 9/2002 | Swartz | |
| 6,463,145 B1 | 10/2002 | O'Neal | |
| 6,529,596 B1 | 3/2003 | Asprey et al. | |
| 6,574,661 B1 | 6/2003 | Delano et al. | |
| 6,631,186 B1 | 10/2003 | Gibson et al. | |
| 6,631,416 B1 | 10/2003 | Bendinelli et al. | |
| 6,640,239 B1 | 10/2003 | Gidwani | |
| 6,662,221 B1 | 12/2003 | Gonda et al. | |
| 6,678,827 B1 | 1/2004 | Rothermel et al. | |
| 6,748,439 B1 | 6/2004 | Monachello et al. | |
| 2001/0048738 A1 | 12/2001 | Baniak et al. | |
| 2001/0049737 A1 | 12/2001 | Carolan et al. | |
| 2002/0054587 A1 | 5/2002 | Baker et al. | |
| 2002/0168055 A1 | 11/2002 | Crockett et al. | |
| 2003/0007621 A1 | 1/2003 | Graves | |
| 2003/0076941 A1 | 4/2003 | Book et al. | |
| 2003/0079028 A1 | 4/2003 | Kortum et al. | |
| 2003/0161459 A1 | 8/2003 | Book et al. | |
| 2003/0200321 A1 | 10/2003 | Chen et al. | |
| 2004/0199624 A1 | 10/2004 | Poisson et al. | |
| 2004/0243708 A1 | 12/2004 | Stebbings | |
| 2005/0114794 A1 | 5/2005 | Grimes et al. | |

FOREIGN PATENT DOCUMENTS

| | | |
|---|---|---|
| EP | 0740480 | 10/1996 |
| WO | 92/09164 | 5/1992 |
| WO | 99/16230 | 4/1999 |
| WO | 99/20058 | 4/1999 |
| WO | 00/65857 | 11/2000 |

WO 01/35240 5/2001

OTHER PUBLICATIONS

Berman, Roger K., and Brewster, John H., "Perspectives on the AIN Architecture," IEEE Communications Magazine, Feb. 1992, pp. 27-32.

Advanced Intelligent Network (AIN) 0.1 Switching Systems Generic Requirements (Bellcore TR-NWT-001284), Issue 1, Aug. 1992.

Advanced Intelligent Network (AIN) 0.1 Switch-Service Control Point (SCP) Application Protocol Interface Generic Requirements (Bellcore TR-NWT-001285), Issue 1, Aug. 1992.

BT Technology Journal, vol. 13, No. 2. Apr. 1995, Ipswich GB. pp. 132-142, Marshall et al., "The information services supermarket".

Internet web pages by Dazil Internet Services, "Caller EyeDee," downloaded Dec. 2001.

Internet Web Pages by Z-Tel, "Personal Communications Center", dated Apr. 13, 2000 and May 15, 2000.

Internet Web Pages by TOSC International, "Cool Call", dated May 4, 2000.

Internet Web Pages by Phone.Com, "My Phone Services", dated May 4, 2000.

Lennox et al., "Call processing Language Framework and Requirements", RFC 2824, published May 2000.

Lennox et al., "CPL: A Language for User Control of Internet Telephony Services", Internet Engineering Task Force, IPTEL WG, published Oct. 25, 2000.

J. Rosenberg, "Intoduction to CPL", Dynamicsoft, Winter 2001 Von Developers Conference, published Feb. 25, 2001.

"Next Generation Phone System", Internet web pages by CommWeb.com, Aug. 2, 2001.

"Teleglobe International Toll Free Services," www.teleglobe.com (Dec. 2002).

"Sprint Wholesale Toll-Free Services," http://www.sprintbiz.com/wholesale/products/toll_free_services.pdf (Jan. 2001).

An article by Kramer, T., "Standalone Call Accounting: The Hardware, the Software, and the Enterprise", Communications Convergence, Mar. 5, 2001, downloaded from http://www.cconvergence.com/shared/article.showArticle.jhtml?articled=8711796&pgno=1 on Jun. 12, 2004.

* cited by examiner

FIG. 8

| USER ID | Positive ID Number | Activity | Date/Time | Effective Date | Status | Status Date/Time |
|---|---|---|---|---|---|---|
| KC1463 | (314) 331-2151 | Sent file | 12/23/95, 08:56 | 1/3/96 | failed | 12/23/95, 09:42 |
| KC1463 | (314) 235-5000 | Accessed | 1/3/96, 08:30 | | | |
| MH1234 | (314) 235-5000 | Sent file | 1/3/96, 13:21 | 1/20/96 | canceled | 1/3/96, 17:55 |
| KC1463 | (314) 235-5000 | Cancel send | 1/3/96, 17:05 | 1/20/96 | completed | 1/3/96, 17:35 |
| MW3344 | (314) 235-6000 | Sent file | 1/3/96, 18:35 | 1/3/96 | pending | |

PROFILE MANAGEMENT SYSTEM INCLUDING USER INTERFACE FOR ACCESSING AND MAINTAINING PROFILE DATA OF USER SUBSCRIBED TELEPHONY SERVICES

CROSS-REFERENCE TO RELATED APPLICATIONS

This is a continuation of U.S. patent application Ser. No. 09/050,986, filed on Mar. 31, 1998, now abandoned which claims the benefit of U.S. provisional Patent Application No. 60/042,680, filed Apr. 3, 1997, entitled "Profile Management System Including User Interface for Accessing and Maintaining Profile Data of User Subscribed Telephony Services", in the names of Baniak et al., the disclosures of which are expressly incorporated herein by reference in their entireties.

This is also related to the disclosure provided in U.S. patent application Ser. No. 08/831,892, filed Apr. 3, 1997, entitled "Apparatus and Method for Facilitating Service Management of Communications Services in a Communications Network", in the names of Larry JOST et al., the disclosure of which is expressly incorporated herein by reference in its entirety.

BACKGROUND OF THE INVENTION

1. Field of the Invention

The present invention generally relates to the field of telecommunications. More particularly, the present invention relates to a user interface, such as a personal computer (PC) interface, for accessing and maintaining profile data of a user's subscribed telephony service.

Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, acronyms will be defined as follows:

Advanced Intelligent Network (AIN)
Computer Access Restriction (CAR)
Common Channel Signaling (CCS)
Central Office (CO)
Calling Party Number (CPN)
Call Processing Record (CPR)
Data and Reporting System (DRS)
Integrated Service Control Point (ISCP)
Interactive Voice Response (IVR)
Local Area Network (LAN)
Personal Computer (PC)
Positive ID (PID)
Private Branch Exchange (PBX)
Service Creation Environment (SCE)
Service Control Point (SCP)
Service Order Assignment Control (SOAC)
Service Management System (SMS)
Service Provisioning And Creation Environment (SPACE)
Service Switching Point (SSP)
Signaling Transfer Point (STP)
Transaction Capabilities Applications Part (TCAP)
Transmission Control Protocol/Internet Protocol (TCP/IP)
User Interface (UI)
Wide Area Network (WAN)
Working Telephone Number (WTN)

2. Background Information

In recent years, a number of new telephony service features have been implemented and provided by an Advanced Intelligent Network (AIN). The AIN evolved out of a need to increase the capabilities of the existing telephone network architecture and meet the growing needs of telephony customers. The AIN architecture generally comprises two networks, a data messaging network and a trunked communications network. The trunked communications network handles voice and data communications between dispersed network locations, whereas the data messaging network is provided for controlling operations of the trunked communications network.

An illustration of the basic components of an AIN network environment is shown in FIG. 1. The AIN network is provided to facilitate communication between a plurality of network locations or stations 72–86. As shown in FIG. 1, central offices (COs) 64–71 are provided for sending and receiving data messages from a service control point (SCP) 56 via one or more signaling transfer points (STPs) 51, 53 and 59. The data messages are communicated to and from the COs 64–71 and the SCP 56 along a common channel signaling (CCS) network 88. Each CO 64–71 serves as a network service switching point (SSP) and may be equipped with CCS capabilities, which provides for the two-way communication of data messages between each SSP and the SCP 56 via CCS network 88. These data messages may be formatted in accordance with Transaction Capabilities Applications Protocol (TCAP).

Each CO 64–71 serving as a network SSP routes AIN-service related telephone calls between a calling station (e.g., station 72) and a called station (e.g., station 84) based on instructions received from the SCP 56. The SSPs 64–71 may be connected by trunked communication lines 90 to transport voice and/or data signals. Each of the stations 72–86 is connected to one or more SSPs 64–71 through private or dedicated telephone lines 93. In AIN-type call processing, the originating SSP is responsible for: identifying calls associated with AIN services; detecting when conditions for AIN service involvement are met; formulating service requests or queries to the SCP 56 for call processing instructions; and responding to the instructions or message responses received from the SCP 56 to complete or terminate the call.

In FIG. 1, the SCP 56 is implemented as part of an integrated service control point (ISCP) 10. The ISCP 10 is an integrated system which may include a programmable SCP 56 and a data and reporting system (DRS) 28. The SCP 56 executes software or programmed-based logic, in accordance with a subscriber's call processing record (CPR), and returns call routing instructions to the SSPs. The DRS 28 compiles calling information to be used for billing and administrative purposes. A service creation environment (SCE) (not shown) may also be provided for programming and provisioning the CPRs stored in the database of the SCP 56. The CPRs define the services for each individual subscriber. The SCE may be integrated with the ISCP 10 or provided as a separate application or entity. By way of a non-limiting example, the ISCP 10 may be implemented with a Bellcore integrated service control point (ISCP) available from Bell Communications Research (Bellcore), Murray Hill, N.J., and the SCE may be implemented with SPACE, which is also available from Bellcore. SPACE is a service provisioning and creation environment. SPACE stores a copy of the data in the ISCP and is the network element used for data queries and management by the selected users which have access to it. The users do not access the ISCP directly because direct access would interfere with call processing by performing data manipulations on the same platform. Updates made through SPACE are input into the ISCP immediately. The service order assignment control (SOAC) system receives all service order activity from service personnel and forwards the service orders to the SMS.

For additional information regarding AIN and AIN-related network environments, see Berman, Roger K., and Brewster, John H., "Perspectives on the AIN Architecture," IEEE Communications Magazine, February 1992, pp. 27–32, the disclosure of which is expressly incorporated herein by reference in its entirety.

A number of services have been provided by AIN or AIN-type intelligent networks to provide specialized call processing of incoming calls and detailed call information. Services such as call routing, call forwarding and call logging have been provided by AIN or AIN-type networks. Service activation of a particular AIN service is normally accomplished by service personnel who receive a service order from a customer, and then provision or create the CPR that is unique for each working telephone number (WTN) in the SCP or ISCP. Each customer's CPR contains subscriber or profile data which control and/or define the service features and parameters associated with the AIN service subscribed to by the customer. Modification to a customer's CPR may be performed by service personnel based on requests received from the customer (e.g., by a formal written submission for service modification or via telephone interaction with service personnel). For more "simple" AIN services (i.e., AIN services that are based on very few or limited service parameters), automated modification systems and methods have also been provided to permit a customer or user to modify their service profile data via a telephone connection and touch tone dialing or Dual Tone Multi Frequency (DTMF) response.

An example of such a simple AIN service is selective call acceptance which was deployed in Wichita, Kans. in 1994. Selective call acceptance allows residential and small business customers to provide a screening list of 50 authorized telephone numbers and one access code in order to allow people calling from one of the authorized numbers or with the access code to connect to the subscriber's working telephone number. If an unauthorized caller calls the subscriber's working telephone number, the unauthorized caller can be routed to an alternative location if desired, for example, a voice mailbox. When the subscriber chooses to modify the authorized numbers and/or access code, the subscriber either contacts service personnel or modifies their service profile data via DTMF.

While such prior systems have been provided, the ability for a customer to freely access and maintain their service profile data has been limited. Prior attempts have relied upon the involvement of service personnel or have limited a customers ability to access and modify their service profile data. DTMF-based interfaces have also not provided an efficient or user-friendly system by which customers may review and revise their service profile data. Further, for more "complex" AIN-based services (i.e., AIN services based on a large number of service parameters or including more complex sets or groups of service parameters) such prior attempts have not provided an effective solution for automated service management and maintenance. Thus, there is currently a need for an interface permitting users to freely access and maintain their service profile data. A need also exists for a user interface permitting a user to review and update their data for services, such as AIN-based services, through a computer-based interface without requiring the involvement of or interaction with service personnel.

SUMMARY OF THE INVENTION

In view of the above, the present invention, through one or more of its various aspects and/or embodiments is thus presented to accomplish one or more objectives and advantages, such as those noted below.

A general object of the present invention is to provide a profile management system having a user interface that provides the ability for a customer to freely access and maintain their service profile data.

Another object of the invention is to provide a profile management system for AIN-based services. A further object of the invention is to provide such a system that does not rely upon the involvement of service personnel to permit a user to access and modify their AIN service profile data.

Still another object of the invention is to provide a profile management system that provides an efficient and user-friendly manner by which customers may review and revise their service profile data.

Yet another object of the invention is to provide a profile management system for more "complex" services (e.g., AIN services based on a large number of service parameters or including more complex sets or groups of service parameters), that permits a user to more effectively access and maintain their profile data for such a complex service.

Another object of the invention is to provide a profile management system that includes a user interface that permits a customer to review and update their profile data for services, such as AIN-based services, through a computer-based interface.

A profile management system is provided for accessing and maintaining profile data associated with a telecommunications service subscribed to by a user. The profile data is stored on a telecommunications network which executes the telecommunications service subscribed to by the user in accordance with the profile data. The profile management system includes a client and a server. The client hosts a user interface allowing the user to view and update the profile data. The server processes user requests from the client to view and update the profile data by obtaining the profile data from the telecommunications network and forwarding the profile data to the client. The server also processes user requests from the client to update the profile data by forwarding user updates of the profile data from the client to the telecommunications network. As a result of the profile management system, the user can access and maintain the profile data associated with the telecommunications service subscribed to by the user without involving service personnel.

In a preferred embodiment, the user interface is a graphical user interface, the telecommunications service is positive identification, and the profile data includes access codes and authorized telephone numbers. Moreover when a calling party calls the user, the calling party is only successfully connected to the user if either the calling party's telephone number is one of the authorized telephone numbers or the calling party inputs one of the access codes. If the calling party is not successfully connected to the user, the calling party hears a prerecorded message and is subsequently disconnected. A reporting system may also be provided which generates reports detailing calling parties attempting to connect to the user. The report may also indicate each calling party successfully connected to the user, and each calling party not successfully connected to the user.

According to another preferred embodiment, the profile management system also includes an access control system which only allows authorized users to access and maintain the profile data. Furthermore, the user may specify a time when the server will forward the user updates from the client to the telecommunications network. The profile management system may also include a DTMF system for accessing and maintaining the profile data.

According to another embodiment, a profile management system is provided for accessing and maintaining profile data associated with a telecommunications service subscribed to by a user. The profile management system includes a server, a client and a telecommunications network. The client hosts a user interface allowing the user to view and update the profile data. The telecommunications network stores the profile data and executes the telecommunications service subscribed to by the user in accordance with the profile data. The server processes user requests from the client to view and update the profile data by obtaining the profile data from the telecommunications network and forwarding the profile data to the client. The server also processes user requests from the client to update the profile data by forwarding user updates of the profile data from the client to the telecommunications network. As a result of the profile management system the user can access and maintain the profile data associated with the telecommunications service subscribed to by the user without involving service personnel.

In a preferred embodiment, the user interface is a graphical user interface, the telecommunications service is positive identification, and the profile data includes access codes and authorized telephone numbers. Moreover when a calling party calls the user, the calling party is only successfully connected to the user if either the calling party's telephone number is one of the authorized telephone numbers or the calling party inputs one of the access codes. If the calling party is not successfully connected to the user, the calling party hears a prerecorded message and is subsequently disconnected.

According to another embodiment, a profile management system is provided for accessing and maintaining profile data associated with an AIN service subscribed to by a user. The profile management system includes a server, client and an AIN network. The client hosts a user interface allowing the user to view and update the profile data. The AIN network stores the profile data and executes the AIN service subscribed to by the user in accordance with the profile data. The server processes user requests from the client to view and update the profile data by obtaining the profile data from the AIN network and forwarding the profile data to the client. The server also processes user requests from the client to update the profile data by forwarding user updates of the profile data from the client to the AIN network. As a result of the profile management system the user can access and maintain the profile data associated with the AIN service subscribed to by the user without involving service personnel.

In a preferred embodiment, the user interface is a graphical user interface, the AIN service is positive identification, and the profile data includes access codes and authorized telephone numbers. Moreover when a calling party calls the user, the calling party is only successfully connected to the user if either the calling party's telephone number is one of the authorized telephone numbers or the calling party inputs one of the access codes. If the calling party is not successfully connected to the user, the calling party hears a prerecorded message and is subsequently disconnected.

According to another preferred embodiment, a profile management system is provided for accessing and maintaining profile data associated with a telecommunications service subscribed to by a user. The profile management system includes a client and a server. The client hosts a user interface allowing the user to view and update the profile data. The server stores the profile data and executes the telecommunications service subscribed to by the user in accordance with the profile data. The server processes user requests from the client to view and update the profile data by forwarding the profile data to the client. The server processes user requests from the client to update the profile data by replacing the stored profile data with user updates of the profile data received from the client. As a result of the profile management system, the user can access and maintain the profile data associated with the telecommunications service subscribed to by the user without involving service personnel.

According to another preferred embodiment, a method is provided for accessing and maintaining profile data associated with a telecommunications service subscribed to by a user. The method includes remotely logging into a server, from a client; viewing the profile data associated with the telecommunications service subscribed to by the user; and if desired, updating the profile data. As a result of the method, the user can access and maintain the profile data associated with the telecommunications service subscribed to by the user without involving service personnel.

The above-listed and other objects, features and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein:

FIG. 8 shows an activity log according to an aspect of the present invention.

DETAILED DESCRIPTION OF THE PREFERRED EMBODIMENTS

Figure 1:
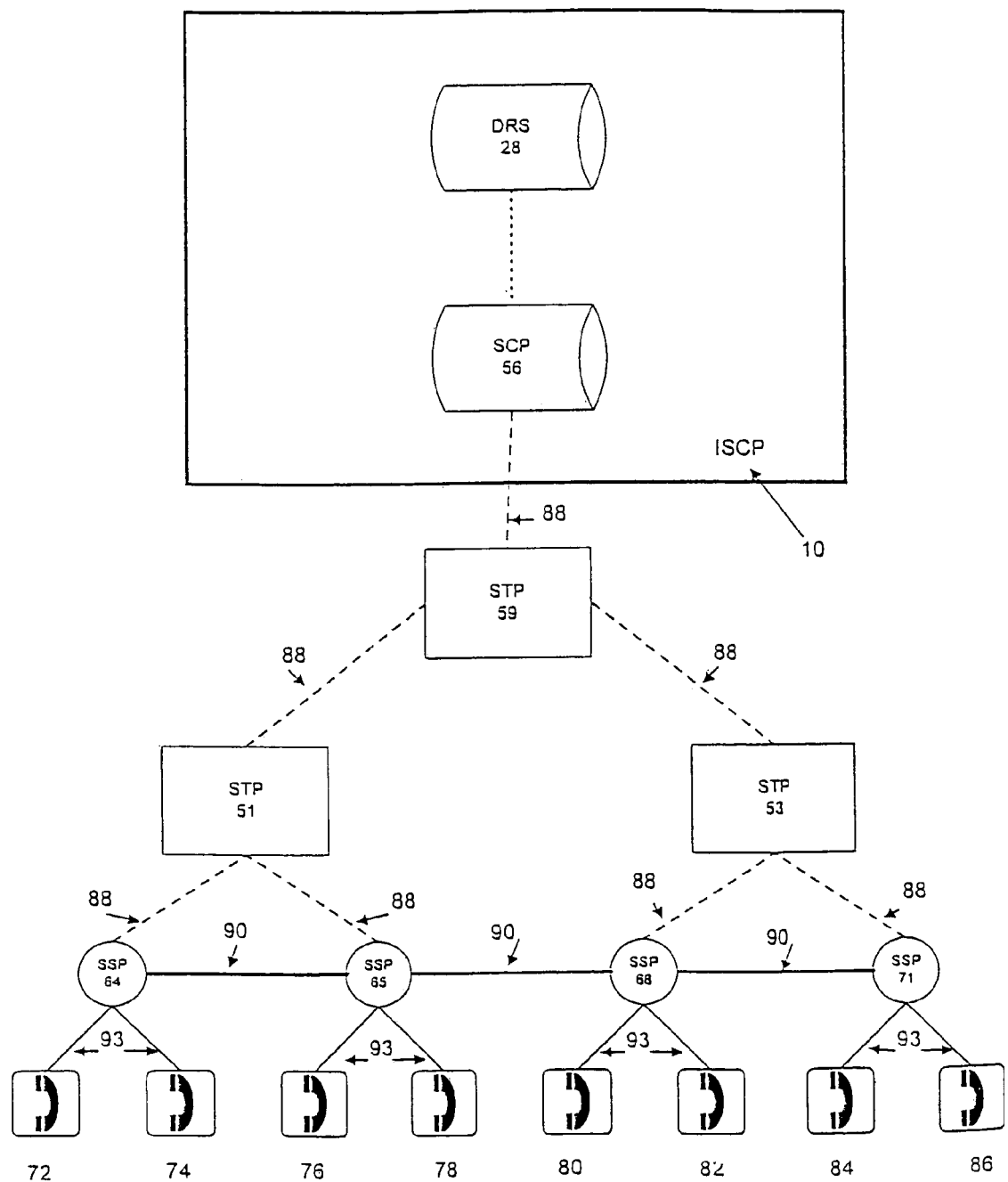
FIG. 1 illustrates the components of a conventional Advanced Intelligent Network (AIN) network environment.

Referring to the accompanying drawings, a detailed description of preferred embodiments, features and aspects of the present invention will be provided.

The present invention relates to a profile management system having a user interface, such as a personal computer (PC) interface, for accessing and maintaining profile data of a user's subscribed telephony service. The telephony service may be a AIN-based service that includes profile data which control and/or define the service features and parameters associated with the AIN service subscribed to by the customer. Through the user interface of the present invention, a customer may freely access, maintain and modify their service profile data without the involvement of or interaction with service personnel. The present invention also provides the ability to selectively access and maintain complex service profile data with a user-friendly and effective interface. When the interface is implemented with a PC interface, one or more display screens may be provided to display the customer's profile data, and to permit a user to build and maintain their data.

The various features and aspects of the present invention are disclosed herein with reference to a particular AIN-based service, which is referred to as "Positive ID (PID)" or "Computer Access Restriction (CAR)" herein. Although the present disclosure describes a particular implementation of the present invention with respect to the PID service, the scope of the invention is not limited to this implementation and the various features and aspects of the invention may be adapted for other AIN-based services or telephony. Changes may be made, within the purview of the disclosure, as presently stated, without departing from the scope and spirit of the invention in its various aspects. Further, although the invention has been described herein with reference to particular means, materials and embodiments, the invention is not intended to be limited to the particulars disclosed herein; rather, the invention extends to all functionally equivalent structures, methods and uses.

As disclosed herein, PID is an AIN-based service that permits a user to control access to their telephone or private line. PID may be used to restricts phone line access to computer systems or other proprietary systems (e.g., PBXs, etc.) of a subscriber. According to one aspect of PID, a screening list of authorized calling party numbers (CPNs) is stored at an ISCP or SCP. When a call is placed to a subscriber's working telephone number (WTN) (e.g., the number of the phone line used to access the subscriber's computer system), an AIN query is launched to the SCP by the serving or originating SSP in order to determine whether the calling party is authorized to access the subscriber's system. Authorization is confirmed when the number of the calling party is located in the screening list of authorized CPNs. If the calling party is not authorized, a denial message may be played back to indicate that access has been restricted. A screening list of override access codes may also be stored in the SCP, to permit employees or other calling parties who are calling from an unauthorized phone number to override the rejection and gain access by entering one of the access codes contained in the screening list.

In accordance with an aspect of the invention, a profile management system may be provided as a tool to PID customers for building and maintaining their profile data, including their lists of authorized telephone numbers and access codes associated with their PID-equipped lines. The user interface of the invention may comprise a PC interface including client software which allows a user to access a secured server of the PID service provider, which will accept changes made by a user through the PC interface. These changes may include revisions to a customer's list that are sent to the AIN network that screens the PID customer's incoming calls. According to an aspect of the invention, the server may also automatically track log-on activity to a customer's account and provide reports so that a user can verify that only authorized individuals have accessed their WTN.

Figure 2:
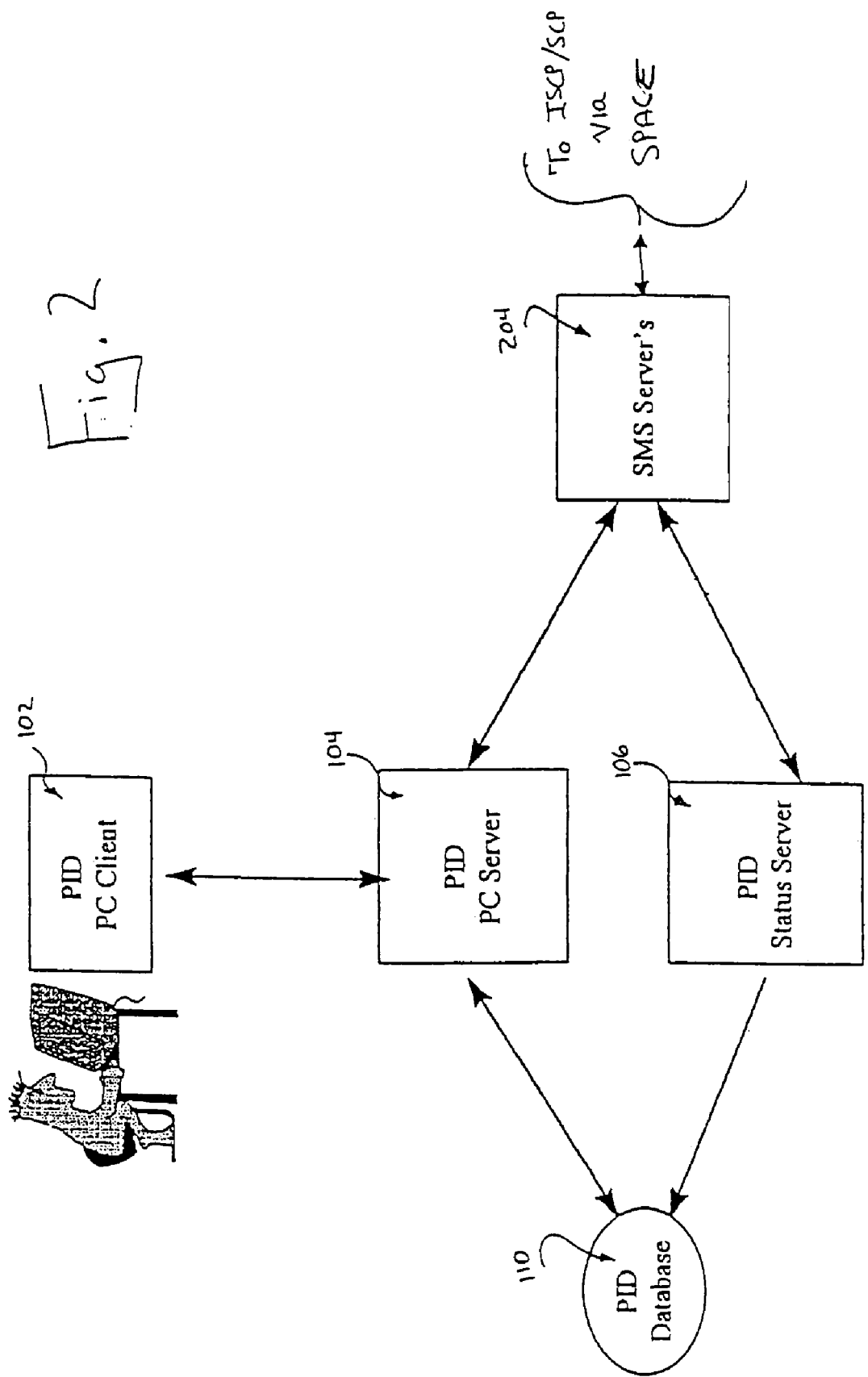
FIG. 2 illustrates, in block diagram form, an exemplary system architecture for implementing the various features and aspect of the present invention.

FIG. 2 illustrates in block diagram form an exemplary system architecture for implementing the present invention. The profile management system of the present invention may include a PID PC client 102 that serves as a PC interface for the PID user or subscriber. Although FIG. 2 depicts a single PID PC client 102, a plurality of PID PC clients may be provided for each AIN-service based user and/or depending on the number of users accommodated by the profile management system of the invention. The PID PC client 102 may comprise PID client software residing on a micro-processor based system or personal computer platform such as an IBM PC or compatible, preferably operating in a Microsoft Windows environment. The PID client software may be programmed with a high level programming language, such as PowerBuilder available from Sybase, Inc. of Emeryville, Calif. and provides various display windows or screens for facilitating the building and maintenance of the user's profile data. A detailed description of the functions and operations performed by the PID client software is provided below.

The PID PC client 102 may include a modem for dialing and accessing a PID PC server 104 through a dedicated/private line or network using, for example, the TCP/IP protocol. Messaging middleware such as "DATAGATE" (which is a message based software application available from Southwestern Bell Telephone Co.) may be utilized by the PID PC client 102 to send and receive messages and information to the PID PC server 104. Although FIG. 2 only depicts one PID PC server, depending on the number of users and system capacity, one or more PID PC servers may be provided that each serve a plurality of PID PC clients. The PID PC client 102 may communicate with the PID PC server 104 to obtain a list of the PID WTNs a user is entitled to work with, and to obtain the detailed information associated with each PID WTN, including the authorized telephone numbers and access codes for user maintenance, e.g., updating the tables.

The PID PC server 104 may comprise an application service to handle the PID client connections and communicates with a Service Management System (SMS) Server 204 to obtain profile data on behalf of subscribers and also to submit subscriber orders. The PID PC server 104 may be implemented with a UNIX-based mainframe or other type of computer, utilizing threads and software programmed in a high level programming language such as C++. The PID PC server 104 may access and interact with the SMS Server 204 via a suitable communication channel or network connections (e.g., a dedicated line, local area network (LAN) or wide area network (WAN)) using TCP/IP and messaging middleware such as "DATAGATE". The SMS Server 204 may be implemented with a UNIX-based mainframe or computer (e.g., a SPARC Center 2000 with a Solaria operating system), and sends information to and receives information from an ISCP or SCP via a service creation environment (SCE) such as SPACE. A more detailed description of the various features of the SMS Server 204 may be found in U.S. patent application Ser. No. 08/831,892 filed Apr. 3, 1997, entitled "Apparatus and Method for Facilitating Service Management of Communications Services in a Communications Network", in the names of Larry JOST et al.

As further shown in the embodiment of FIG. 2, the profile management system of the invention may also include a PID status server 106 and PID database 110. The PID status server 106 may comprise an application service to handle asynchronous acknowledgments of client order completion and new PID order notifications from the SMS Server 204. The detailed profile data for each Positive ID WTN (i.e., the authorized telephone number list and access codes) may be simultaneously stored by the SMS server 204 and in the database of the ISCP or SCP. The SMS server 204 keeps a duplicate of the profile data stored in the ISCP to facilitate update and modification of a user's profile data and to provide a backup in case of system failure or outage.

The PID database 110 may store additional data required by the profile management system of the present invention. For example, the PID database 100 stores information relating to orders for new service including the order status and may be used to check all activity on a service order, including creation and cancellation. Furthermore, the PID database 100 may store indicators showing whether a specific user has access to a positive ID number or is locked from access for a positive ID number.

The PID status server 106 may be implemented with a UNIX-based mainframe or computer, utilizing threads and software programmed with a high level programming language such as C++. The PID status server 106 may access and interact with the SMS Server 204 via suitable communication channels or network connections (e.g., a dedicated line, local area network (LAN) or wide area network (WAN)) using TCP/IP and messaging middleware such as "DATAGATE". The PID database 110 may be implemented with a suitable storage device or as part of the memory of a UNIX-based mainframe or computer system. It is also possible that several of the main components of the profile management system, including the PID PC server, the PID status server and the PID database are implemented on a single mainframe or computer system (such as a UNIX-based mainframe).

Figure 6:
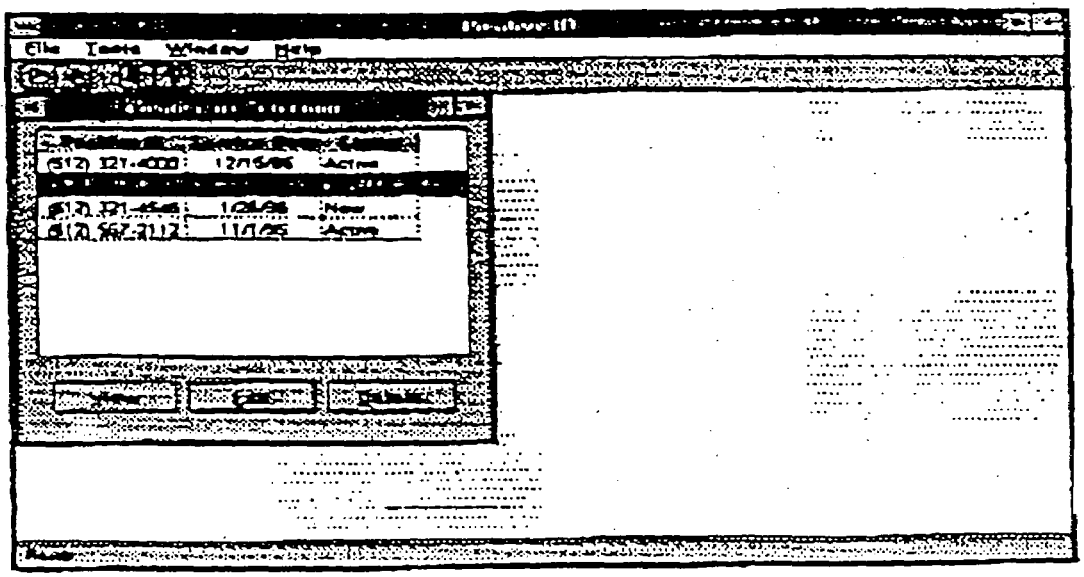
FIG. 6 illustrates a list of Positive ID numbers and their status as displayed by an exemplary user interface according to an aspect of the present invention.
Figure 7:
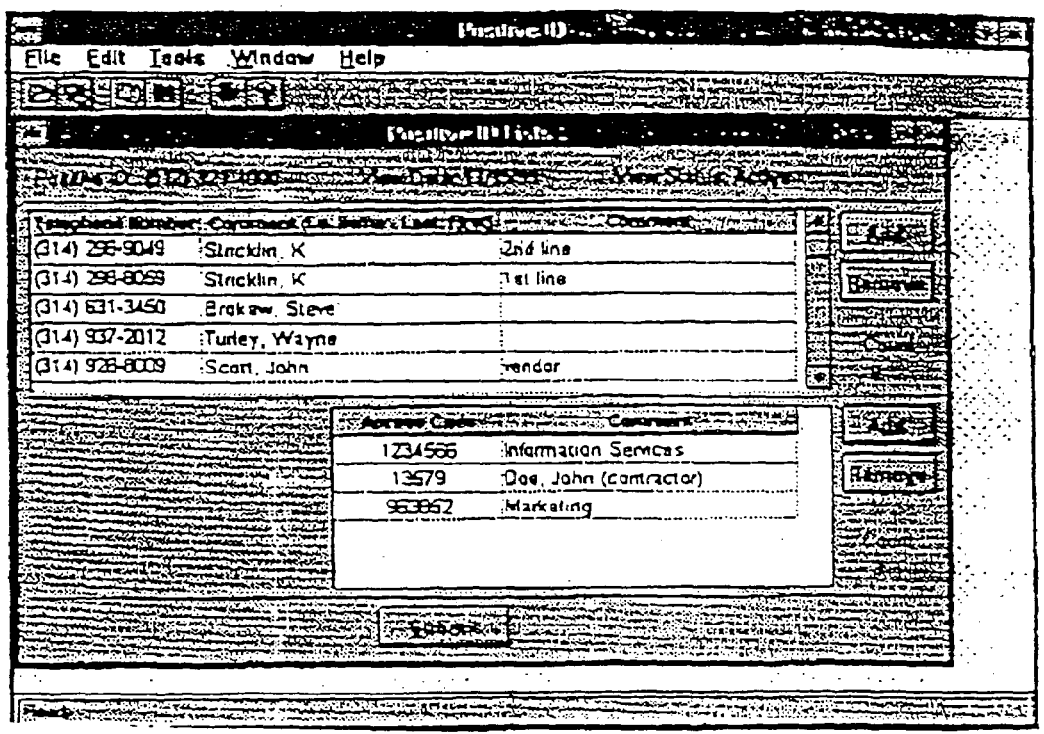
FIG. 7 illustrates an authorized telephone number table and access code table as displayed by an exemplary user interface according to an aspect of the present invention.

The user interface is now described with reference to FIGS. 6 and 7. Initially, the user logs onto the PID PC server 104 from the PID PC client 102. In a preferred embodiment, the log-in is password controlled. After the user ID and password is verified, a screen similar to that shown in FIG. 6 will appear. FIG. 6 shows all working telephone numbers associated with the user's password and user ID. Then, a user may select one of the WTNs to view, edit or delete. The screen shown in FIG. 6 also indicates a status of each WTN. If the WTN is shown as ACTIVE, the date in the second column indicates the date the current profile data was put into service to restrict calls. When a WTN is active, the view and edit button are available, whereas the delete button is unavailable. Viewing the ACTIVE status tables is particularly important when trying to establish if an authorized person's telephone number is, in fact, on the table and also whether a given access code is valid.

If the status column for a WTN indicates PENDING, then a file containing authorized telephone numbers and access codes has been created with changes in it, but those changes have not yet become effective. Pending files can be created for immediate processing or with an effective date some time in the future, which the user may select. A pending file can also be deleted, which will completely eliminate the submitted file. When a pending file is deleted, a new pending file can be created by editing an active WTN. The status of a WTN is shown as NEW from the time that the Positive ID service is ordered until the service establishment date passes.

To select a PID WTN for editing or viewing, the user highlights a desired WTN and presses the edit or view button as shown in FIG. 6. In a preferred embodiment, the screen shown in FIG. 7 will then appear displaying both the authorized telephone number and access code tables. The authorized telephone number table stores the authorized telephone number in the first column, and comments in the second and third columns. Typically, the second column will store the name of the person associated with the authorized telephone number. The second comment column (third column in FIG. 7) may be used, for example, to indicate a department associated with the authorized telephone number.

According to a preferred embodiment, both tables can be sorted to provide ease in analyzing the information. By double clicking on any column heading, the data will be sorted by the information in that column in ascending order. For example, by double clicking on the column storing authorized telephone numbers, the authorized telephone number table will be sorted in ascending order by authorized telephone number. By double clicking on the comments field, the authorized telephone number table will be alphabetically sorted by the data in the comments field, e.g., by name.

In a preferred embodiment, the authorized number table stores up to 500 numbers, although any other maximum number of authorized telephone numbers can be utilized depending on available storage capacity. Preferably, the authorized telephone numbers are stored in the area code—telephone number format, which is 10 digits in length. By pressing the add button when editing the authorized telephone numbers table, the user may insert a new authorized telephone number into the table. By highlighting an authorized telephone number and pressing the remove button, the user may delete an authorized telephone number from the table.

In a preferred embodiment, the access code table is limited to 100 entries, although any other number may be used depending on available system storage. In a preferred embodiment, the access codes are 4 to 7 digits in length. As shown in FIG. 7, the access code table contains one comment field for information, such as the department, associated with each access code. An access code can be added and deleted in the same manner as the authorized telephone number is added and deleted.

Referring back to FIG. 6, when a PID WTN shows a NEW status, no tables exist for that WTN. However, a user may view and edit the unpopulated tables. New tables associated with the NEW WTN can be created by pushing the edit button. Pushing the edit button creates a pending version of the tables that may be submitted to the SMS server 204 when editing is completed. If the PID WTN number is shown as ACTIVE, no pending file exists for that WTN. However, a user may view the file (storing the tables) currently restricting access to the WTN and may create a new file. After the user creates a new file by completing editing of the file, the WTN will show PENDING status. If another user is editing a WTN's tables, then the tables can only be viewed (not edited), because only one pending file can exist for each PID WTN.

If a PID WTN has a PENDING status, a file has been created with changes to the table associated with that PID WTN and the file has been submitted, but the changes have not yet become effective. In a preferred embodiment each PID WTN is permitted one pending file. The pending file can be edited, but the edited version will replace the existing pending file. The pending file can also be deleted, which will completely eliminate the submitted file. When a pending file is deleted, a new pending file can be created by editing the new or active PID WTN. Moreover, when a PID WTN is PENDING, the user may elect to view either the active file, or the pending file. In other words, the user may view the file currently controlling access to the PID WTN, or the file scheduled to control access when it becomes effective.

In a preferred embodiment, when submitting files to the SMS server 204, an effective date of the submitted file must be selected. Selecting an effective date in the future allows updates to the tables to be made in advance of when the file is actually needed. For example, if a new employee is joining a group in a week, the file could be updated and submitted, but not be made effective until the next week when the employee is part of the group.

Once the user selects a PID WTN to view or edit, the PID PC server 104 launches a query to the SMS server 204 to retrieve the tables (authorized telephone number table and access code table) associated with that PID WTN. The PID PC server 104 also locks the PID WTN, so that no other user can access the tables for editing purposes, until the initial user has completed working with the tables.

In a preferred embodiment, the authorized telephone numbers field and comments fields of the authorized telephone numbers table are stored by the SMS server 204, but the comment fields is stripped off prior to the SMS server 204 sending the message to SPACE. Consequently, if the user only changes information in the comments field, the PID PC client 102 sends a message to the PID PC server 104 indicating that only comments have changed. The PID PC server 104 then sends only the comments field to the SMS server 204 and will mark the change as local only. The local indication tells the SMS server 204 that the update should not be sent onward to SPACE and the ISCP, but should be saved within the SMS server 204.

A detailed description of exemplary interactions between the various main components of the profile management system (i.e., the PID PC Client, the PID PC Server, the PID Status Server, and the PID Database) is now provided. The messaging between the various components is facilitated with messaging middleware such as DATAGATE. First, the messages between the PID PC client 102 and the PID PC server 104 are described.

In a preferred embodiment, the connection between the PID PC client 102 and the PID PC server 104 is via TCP/IP using either a dial up connection or a dedicated line. Initially, the PC client may initiate a log in request by transmitting the user ID and password to the PC server. The PC server responds by accepting the log in or rejecting the log in. The PC client may also initiate a request to change a password to which the PC client responds by either accepting or rejecting the request.

Another possible transaction between the PC client and PC server is retrieving the list of PID WTNs the user has access to, along with information about all pending activities to be performed on each PID WTN. Upon receipt of the PID WTN information, the user interface on the PC client displays the information in a manner similar to that shown in FIG. 6. For a new PID WTN not yet established, which the user has yet to submit tables for, the PC server assigns a NEW status for this PID WTN.

Another possible transaction between the PC server and PC client is retrieving the authorized telephone number table and access code table associated with a specific PID WTN. As described above, the user may view the active or pending files. The PC server's response to the PC client's requests includes a read-only data structure if another user is currently working with the PID WTN's pending file i.e., the file is locked, or if the active file is requested. Note, a user may lock a PID WTN that has a pending file, if the user is requesting the pending file. However, if the user is requesting the active view, the lock will be rejected.

Another possible transaction between the PC client and PC server is modifying the authorized telephone number table and the access code table associated with the PID WTN. The PC server responds to the request with either a success or failure indication.

Another set of possible transactions between the PC server and PC client is establishing and releasing a user's lock on a PID WTN's file. Establishing the user's lock locks the PID WTN's file from write access by other users. In other words, a lock prevents any other user from editing the tables associated with the PID WTN. When a user requests a view of a pending PID WTN file, the PC server locks the pending PID WTN's file, preventing any other user from submitting modifications to the PID WTN's file. The release lock transaction may be used to unlock the PID WTN's file. The release lock request is sent by the user interface on the PC client when a user has exited the PID edit screen.

A cancel pending request transaction is also possible between the PC client and the PC server. The cancel pending request transaction allows a user to cancel a pending request against the PID WTN. In a preferred embodiment, the user selects a specific file for canceling or a file assigned to a specific pending date. After canceling a pending request on a PID WTN, the user interface may allow the user to edit the pending view (retrieved prior to the cancellation) and resubmit the request. A user must obtain a lock on the PID WTN after performing the cancel. Cancellation of a pending file for a PID WTN that is locked is prohibited, unless the file is being canceled by the user holding the lock.

An additional PC client to PC server interaction is for status log requests. a status log request transaction retrieves the status log history of a specified PID WTN, or all PID WTNs associated with a user. If a PID WTN is specified in the request, then the log for that PID WTN is returned. Otherwise, the log for all the PID WTNs associated with the user are returned. A user may also request a date which will be the cutoff time from when the log information begins. If the date is unspecified, the PC server returns all available log information for the selected PID WTNs.

Possible PID PC server 104 to SMS server 204 interactions are now described. The PC server connects to the SMS server over a LAN using TCP/IP and messaging middleware, such as DATAGATE. The PC server may request the current or pending view of the authorized telephone number and access code tables associated with a PID WTN. The PC server may also request to update the PID tables and request to cancel the update of the authorized telephone number and access code tables associated with the PID WTN. In both cases, the SMS server responds with either a success or an error.

Interactions between the SMS server 204 and the PID status server 106 are now described. The SMS server connects to the status server via the LAN using TCP/IP and messaging middleware, such as DATAGATE.

When an order for Positive ID is received by the SMS (e.g., from SOAC), the SMS server sends associated information, such as the WTN and its user ID, to the status server. The status sever then inserts the new WTN into a table storing all PID WTNs. After the successful table addition, the status server sends a confirmation message back to the SMS server. An order may also be changed or deleted. If a prior version of the order exists, the status server resolves differences between the two versions. For example, if the prior version of the order creates a PID WTN not created by the latest version of the PID WTN, the status server removes the PID WTN. Alternatively if new PID WTNs are created by the newer version of the order, the status server adds the new PID WTNs. The revised order is then stored in the PID database 110. If a cancel request is received, the old order is read in from the PID database and the initial work for the order is undone, the order status is set as CANCELED and the order is updated in the PID database.

In a preferred embodiment, the SMS server 204 sends the message indicating a pending PID WTN before the due date on the service order because the subscriber then has time to set up their lists of authorized telephone numbers and access numbers prior to the effective date of their service. Thus, the service can be activated the same day the user begins paying for it. In cases other than Positive ID, when the SMS server receives a service order from SOAC, a field in the message received by the SMS server should be provided to indicate the type of service being ordered.

The SMS server may also send an acknowledgment that the PID tables are updated when the SMS server has processed a user requested update sent to the SMS server. In response to the acknowledgment, the status server changes the status associated with the WTN from PENDING to ACTIVE.

The SMS server may also send a cancellation acknowledgment to the status server when the SMS server has processed a user request to cancel a user generated file (storing the tables). The status server responds by updating the status of the order. The status of the order is set to CANCELED.

Figure 3:
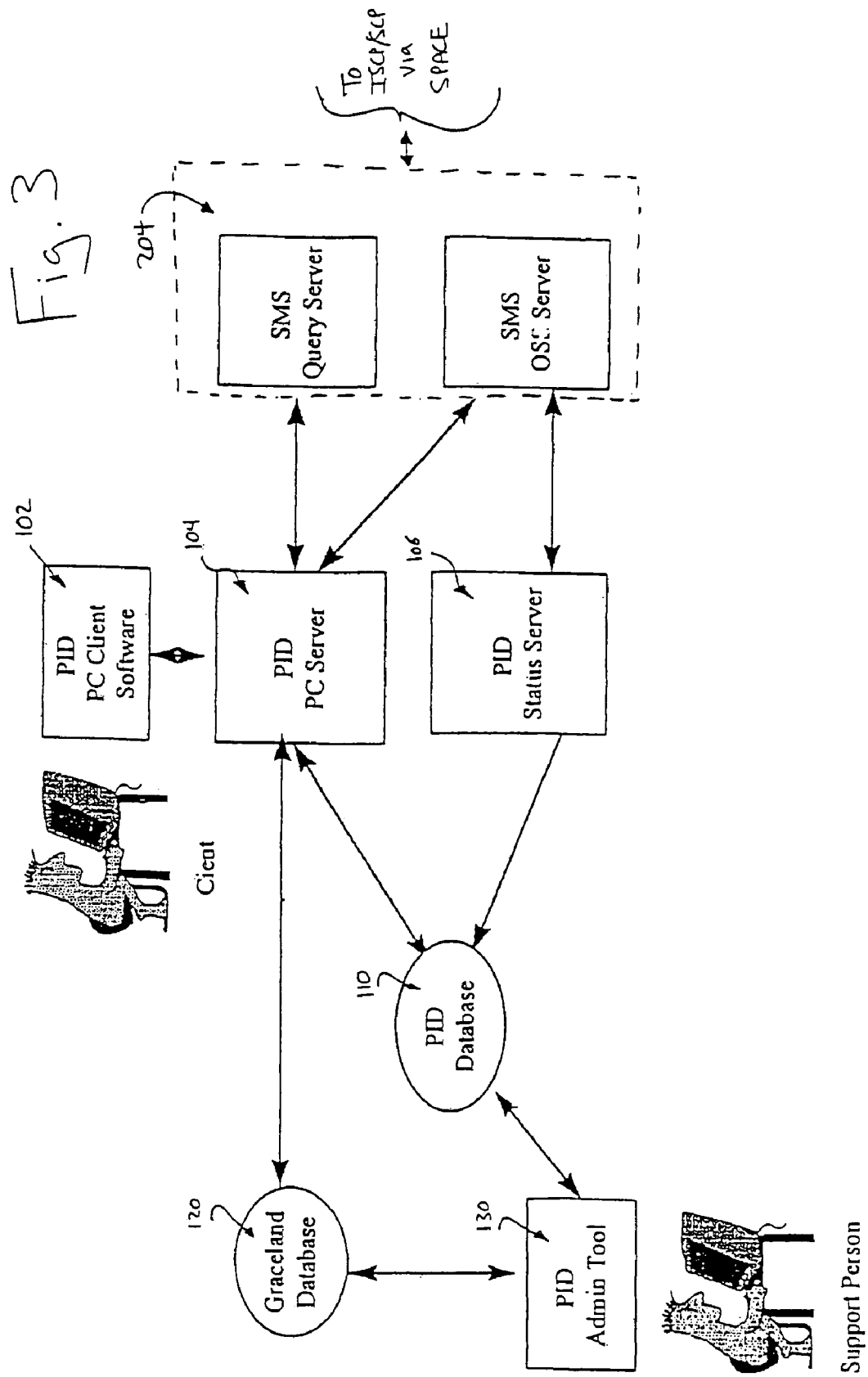
FIG. 3 illustrates, in block diagram form, another exemplary system architecture for implementing the features of the present invention.

FIG. 3 illustrates in block diagram form another exemplary system architecture for implementing the features of the present invention. The main components of the profile management system (i.e., the PID PC client 102, the PID PC server 104, the PID status server 106, and the PID database 110) may be configured similarly to the system described with reference to FIG. 2. The SMS server 204 may also be configured similarly to SMS server in FIG. 2, or it may be implemented with two main interfaces (e.g., a SMS query server and a SMS O.S.S. server) as shown in FIG. 3. The SMS query server comprises an interface for the PID PC server 104 and sends queries to the ISCP or SCP database via SPACE to obtain a customer's profile data for subsequent viewing at the PC client 102. The service profile data obtained by the SMS query server (based on a request from the PC server 104) may be sent back to the PC client 102 via the PC server 104. As noted above, the SMS server 204 may also comprise a database (not shown) for storing a copy of the profile data of all PID customer's stored in the ISCP or SCP. The redundancy may be provided to protect against outages or system defaults at SPACE or the ISCP/SCP, and the data stored at the SMS may be updated with the ISCP/SCP profile data on a periodic basis (e.g., once a day, etc.) to maintain accuracy. When a copy of the customer's profile data is provided at the SMS server 204, the SMS query server may query the SMS database to obtain a customer's profile data for viewing. In addition, a SMS O.S.S. server (see FIG. 3) may be provided as part of the SMS server 204 to handle updates to a customer's profile data (received from the PC client 102 via the PID PC server 104). The SMS O.S.S. server may also initiate and process a customer's service order (e.g., to populate or change a user profile) and acknowledge the status of the customer's order (in the form of a feedback message to the PID status server 106).

Various methods and procedures may be provided for service initialization and activation. For example, in the embodiment of FIG. 3, a user wishing to subscribe to PID may contact service personnel (e.g., by telephone, the internet or e-mail) and request that a service order be placed. When placing the service order, a client may provide contact information to the service personnel. After collecting all of the pertinent information, the client order will be entered by the service personnel (e.g., at a SOAC system terminal) and will flow to SMS for provisioning. The SMS server 204 will then send an acknowledgment message (e.g., via the SMS O.S.S. Server) to the PC status server 106 to confirm, for example, receipt of the customer's order and that the processing of the order has been initiated. The PID database 110 may include a SOAC order table to list a new client's order that has been received and confirmed by the SMS.

Support personnel may access and view the SOAC order table of the PID database 110 via a PID administration tool 130 (which may comprise a computer based interface for accessing and storing information with the PID database). When a support person sees that a new order is present in the SOAC order table, the support person may contact the customer or client based on the contact information that was provided. From the new customer or client, the service person may gather various information to provision the PID PC interface feature of the invention. For example, the service personnel may obtain and setup a user ID and password for the user of the PID PC client software, and determine the client's system specifications. The service person may also confirm the user's address and send the PC client software to the user for installation.

The user ID and password may be provisioned and stored in an access database 120 by the support person, to provide a security feature for limiting access to the PID PC server 104 and access to the customer's profile data. The access database 120 may be implemented with "Graceland", which is an access and security management tool available from Southwestern Bell Telephone, and the database may be queried and searched by the PID PC server 104 to verify a user's password and user ID before granting access to a client at PID PC client 102. Of course any other access and security management tool can be substituted for "Graceland".

According to another preferred embodiment, a user may choose to retrieve an activity log either in its entirety or by selecting a specific WTN and/or date after which all entries should be displayed. The activity log displays transactions related to each Positive ID WTN associated with the user ID. An example of an activity log is illustrated in FIG. 8. The first column indicates the user associated with the activity being logged. In the log file shown in FIG. 8, three different users all had activities logged. The second column indicates the WTN associated with the activity. The third column displays the activity. Possible activities for a WTN are: ACCESSED indicating a Positive ID WTN table was reviewed; and SUBMITTED indicating a Positive ID WTN table was changed and sent to the SMS server 204. Thus, a modified table will show two log entries, one for accessed and one for submitted. Additional activities are: CANCEL SEND indicating a pending file was canceled before it became active and REPLACED indicating the pending file was edited and resubmitted to the SMS server 204. Thus, a replaced table will show two log entries, one for ACCESSED and one for REPLACED.

The Date/Time column shows the date and time when the activity occurred. The effective date column, shows the date that a pending file is to be made active or the date when another activity is made effective. In the status column, the status value can be PENDING, CANCELED, COMPLETED, IN PROCESS and FAILED. PENDING indicates that files have been submitted but have not become active yet. If the pending file was submitted for a future effective date, it will remain in PENDING status until edited or the effective date passes. If the effective date field is today's date, the file was sent for immediate processing and will show an IN PROCESS status until confirmation is received from the AIN network that the changes have become active. The COMPLETED status indicates the file that was submitted is now effectively restricting access to the PID WTN. The FAILED status indicates the submitted file failed. A CANCELED status indicates the pending file was deleted before it was made active. Any authorized user may delete a pending file, not only the user who created the pending file. The Status Date/Time column indicates the date and time the status changed to the status shown in the Status column. Thus, the activity log provides the user information for tracking changes.

According to a preferred embodiment, when the PID PC client 102 is connected with the PID PC server 104, a time out may occur. The time out requires a password to be re-entered after a period of inactivity. In a preferred embodiment, the period is 15 minutes. Therefore, after 15 minutes with no keystrokes, the user's keyboard would lock, relative to the profile management application, until the password is re-entered.

In addition to accessing the profile data with the PID PC client software, an interactive voice response (IVR) system i.e., DTMF, may also be employed according to another embodiment. The IVR system allows the user to add, delete and verify authorized telephone numbers and access codes from any location using a touch tone phone. Once the initial authorized telephone number and access tables have been created and transmitted via the PC interface, the IVR may be used to update the profile data. By calling the IVR and following touch tone commands, updates can be made which become effective immediately. The IVR can also be used at any time to audibly review the tables of authorized telephone numbers and access codes. To use the IVR, the user must enter a password and the PID WTN enabling the user to access the information. The combination of the PID WTN and the password will authenticate users.

While the invention has been described with reference to several exemplary embodiments, it is understood that the words which have been used herein are words of description and illustration, rather than words of limitations. Changes may be made, within the purview of the disclosure, as presently stated and as amended, without departing from the scope and spirit of the invention in its aspects. Further, although the invention has been described herein with reference to particular means, materials and embodiments, the invention is not intended to be limited to the particulars disclosed herein; rather, the invention extends to all functionally equivalent structures, methods and uses.

Figure 4:
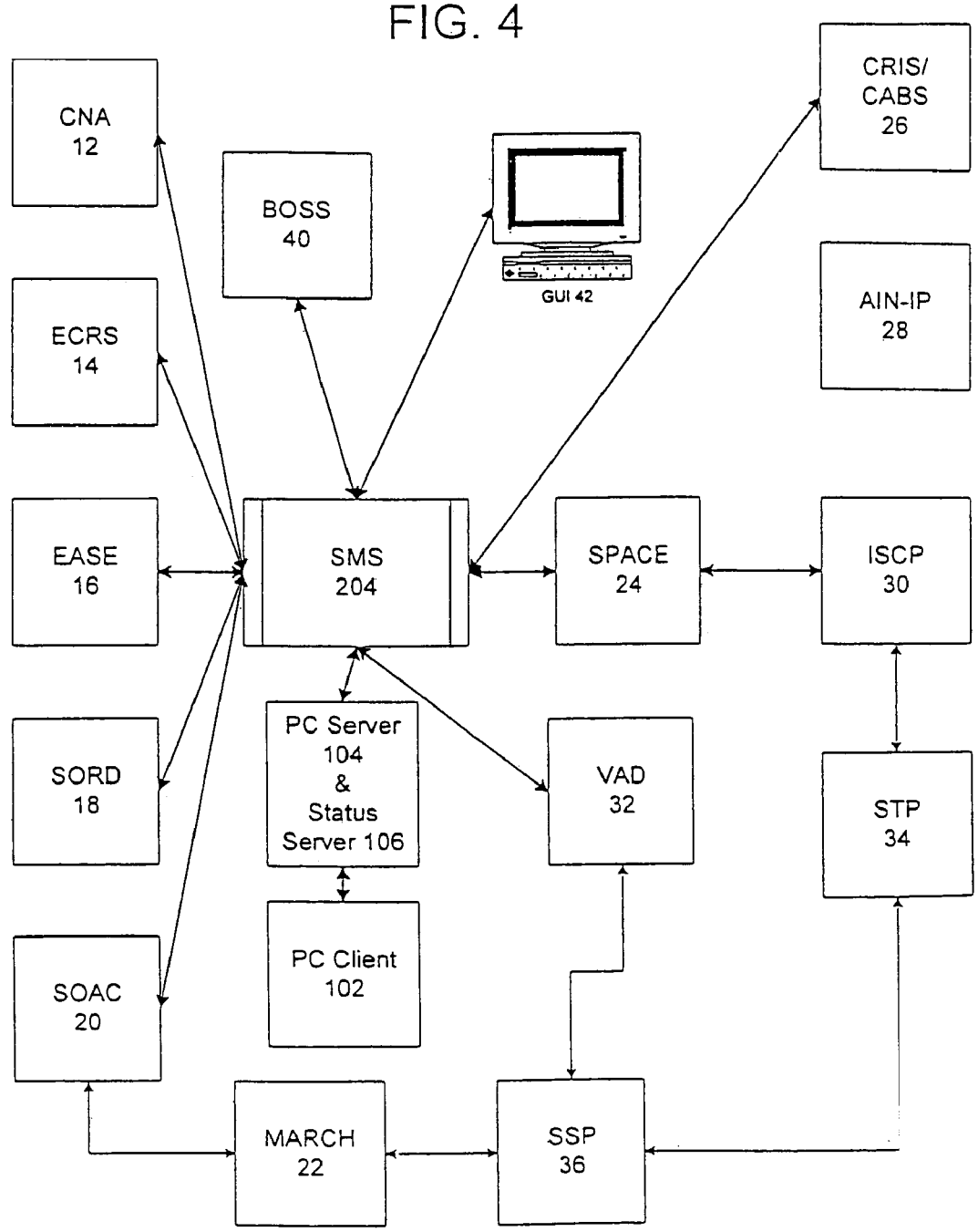
FIG. 4 illustrates yet another exemplary system architecture and environment for implementing the present invention.
Figure 5:
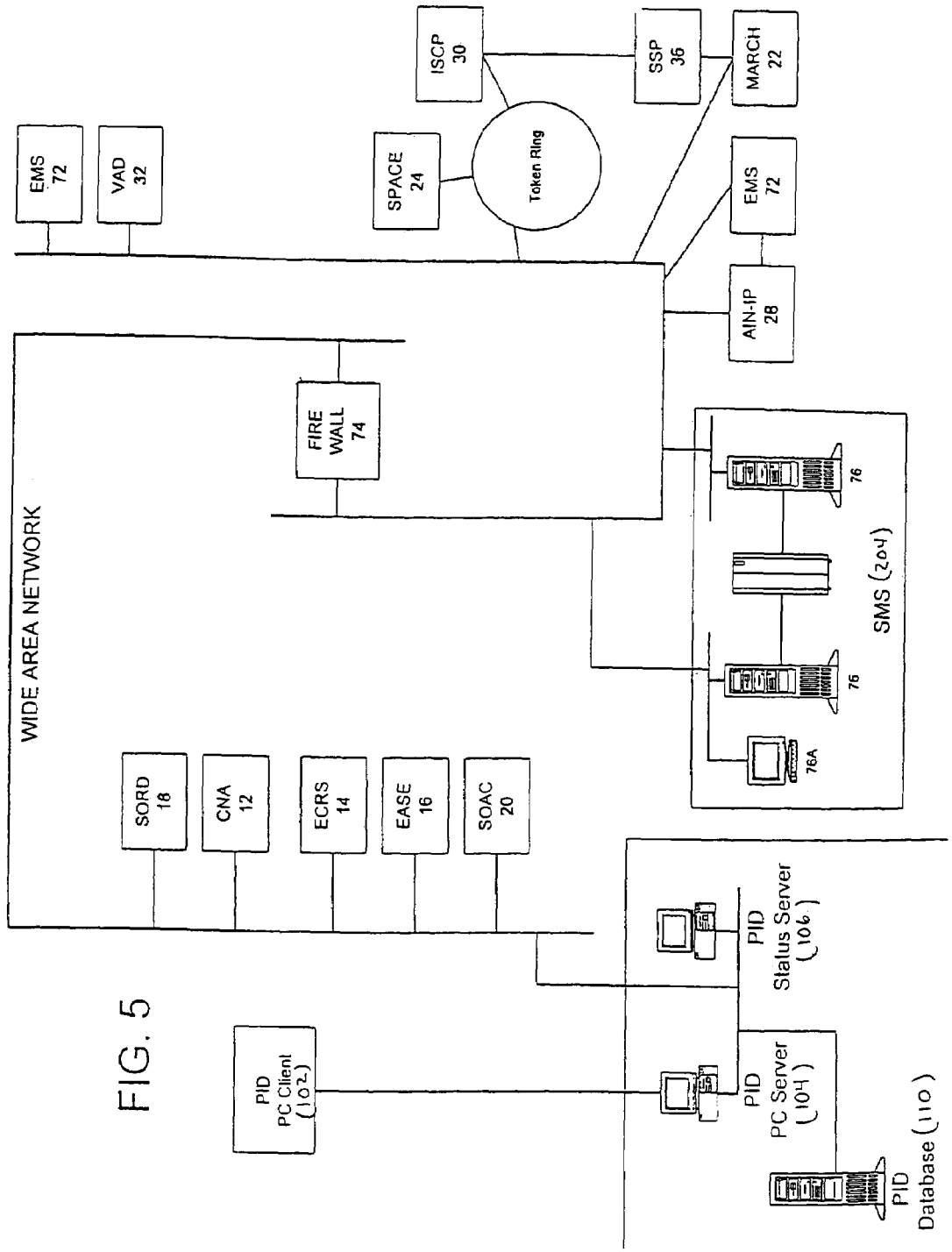
FIG. 5 illustrates a further exemplary system architecture and environment for implementing the features of the present invention.

For example, FIGS. 4 and 5 illustrate, in general block diagram form, other exemplary system architectures and environments for implementing the invention. FIG. 4 illustrates a system environment in which the invention may be implemented, with the PC server 104 and the PID status server 106 residing on the same platform or entity. Although not shown in FIG. 4, the PID database 110 may also be provided on the same platform or system entity of the PID PC server and PID status server. In addition, FIG. 5 illustrates an exemplary WAN-based architecture for implementing the invention. A description of the various components depicted in FIGS. 4 and 5 may be found in the U.S. patent application Ser. No. 08/831,892 filed Apr. 3, 1997, entitled "Apparatus and Method for Facilitating Service Management of Communications Services in a Communications Network", in the names of Larry JOST et al., the disclosure of which is expressly incorporated herein by reference in its entirety.

Although the present invention has been described in considerable detail with reference to certain preferred embodiments, other embodiments are possible. Therefore, the scope and spirit of the appended claims should not be limited to the description of the preferred embodiments contained herein.

What is claimed is:

1. A profile management system for accessing and maintaining profile data associated with a telecommunications service subscribed to by a subscriber, the profile data being stored on a telecommunications network which executes the telecommunications service subscribed to by the subscriber in accordance with the profile data, the profile management system comprising:
    a client which hosts a user interface allowing the subscriber to view and update the profile data; and
    a server which processes subscriber requests from the client to view and update the profile data by obtaining the profile data from the telecommunications network via at least one intermediate system and forwarding the profile data to the client, the server processing subscriber requests from the client to update the profile data by forwarding subscriber updates of the profile data from the client to the telecommunications network via the at least one intermediate system.

2. The profile management system of claim 1, in which the user interface is a graphical user interface.

3. The profile management system of claim 2, in which the telecommunications service comprises positive identification, and in which the profile data comprises access codes and authorized telephone numbers.

4. The profile management system of claim 3, wherein when a calling party calls the subscriber, the calling party is only successfully connected to the subscriber if either the calling party's telephone number is one of the authorized telephone numbers or the calling party inputs one of the access codes, wherein if the calling party is not successfully connected to the subscriber, the calling party hears a prerecorded message and is subsequently disconnected.

5. The profile management system of claim 4, further comprising a reporting system which generates reports comprising calling parties attempting to connect to the subscriber, indicating each calling party successfully connected to the subscriber, and each calling party not successfully connected to the subscriber.

6. The profile management system of claim 1, further comprising an access control system which only allows authorized subscribers to access and maintain the profile data.

7. The profile management system of claim 1, in which the subscriber specifies a time when the server will forward the subscriber updates from the client to the telecommunications network.

8. The profile management system of claim 1, further comprising a DTMF system for accessing and maintaining the profile data.

9. The profile management system of claim 1, in which the intermediate system further comprises a server management system (SMS) server.

10. The profile management system of claim 1, in which the intermediate system further comprises SPACE.

11. The profile management system of claim 1, in which the server communicates with the client using TCP/IP.

12. A profile management system for accessing and maintaining profile data associated with a telecommunications service subscribed to by a subscriber, the profile management system comprising:
- a client which hosts a user interface allowing the subscriber to view and update the profile data;
- a telecommunications network which stores the profile data and executes the telecommunications service subscribed to by the subscriber in accordance with the profile data; and
- a server which processes subscriber requests from the client to view and update the profile data by obtaining the profile data from the telecommunications network and forwarding the profile data to the client, the server processing subscriber requests from the client to update the profile data by forwarding subscriber updates of the profile data from the client to the telecommunications network;

wherein the subscriber can access and maintain the profile data associated with the telecommunications service subscribed to by the subscriber without involving service personnel.

13. The profile management system of claim 12, in which the user interface is a graphical user interface.

14. The profile management system of claim 13, in which the telecommunications service comprises positive identification, and in which the profile data comprises access codes and authorized telephone numbers.

15. The profile management system of claim 14, wherein when a calling party calls the subscriber, the calling party is only successfully connected to the subscriber if either the calling party's telephone number is one of the authorized telephone numbers or the calling party inputs one of the access codes, wherein if the calling party is not successfully connected to the subscriber, the calling party hears a prerecorded message and is subsequently disconnected.

16. The profile management system of claim 12, in which the server communicates with the client using TCP/IP.

* * * * *